United States Patent Office 2,797,067
Patented June 25, 1957

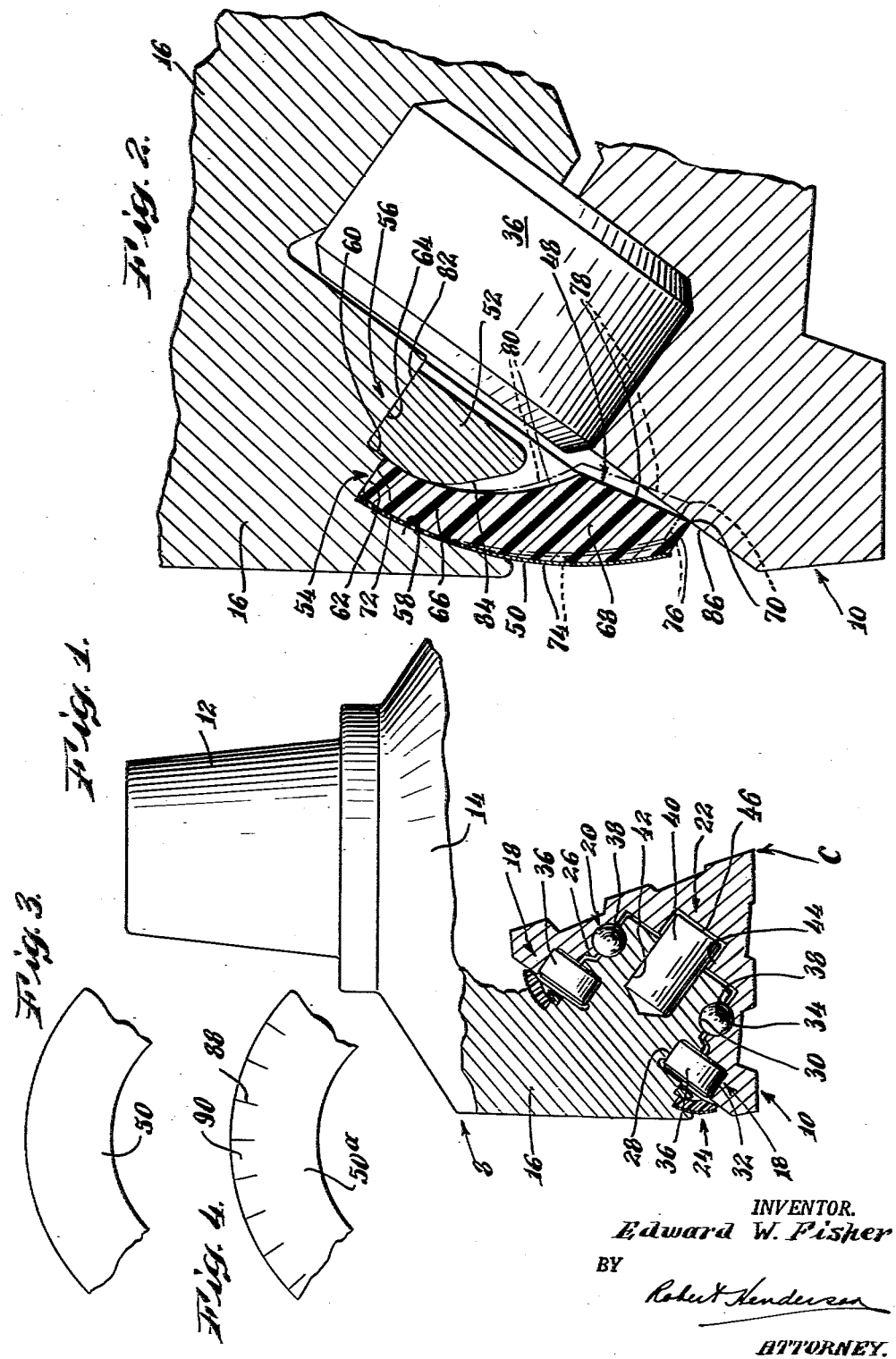

2,797,067

SHIELDED SEALS

Edward W. Fisher, Palmyra, N. Y., assignor to The Garlock Packing Company, Palmyra, N. Y., a corporation of New York Application September 16, 1954, Serial No. 456,477

4 Claims. (Cl. 255—343)

This invention relates generally to seals such as are employed to function between two relatively rotatable elements to prevent leakage of a fluid lubricant from within a bearing or lubricant-containing area between said elements and/or to prevent foreign matter from getting into such a bearing or area.

Seals according to this invention are particularly, although not exclusively, useful in structures wherein, in service, more or less abrasive foreign matter is thrown or washes against the seal, thereby tending strongly to wear the seal away prematurely. A good illustration of such a situation is present in relation to seals, for rotary oil well-drilling bits, used to provide a seal between a rotary cutting member and a stud or shank on which that member is rotatably supported. In such usage, fluid mud is circulated forcibly down through the drill tube and bit into the drilled hole and around the drill bit to entrain and carry off cuttings through said hole, about the exterior of the drill tube. The mud thus used is highly abrasive and, where use is made of seals heretofore developed, the seal is quickly worn away, making it necessary to discard the drill bit before its cutting parts have worn to such an extent as to necessitate discarding of the bit as a whole.

Accordingly, an important object of this invention is the provision of a seal having a long, useful life even when subjected to substantial abrasion.

Another important object is the provision of a seal wherein the part which yields the sealing effect is highly durable and, in addition, is protected against abrasion.

Another important object is the provision of a drill bit which has a longer useful life than those heretofore developed.

The foregoing and other more or less obvious objects are derived from the present invention of which two embodiments are illustrated in the accompanying drawing without, however, limiting the invention to said two embodiments or to the invention's usage only with drill bits as shown.

In said drawing:

Figure 1 is a central, axial, sectional view of a seal according to this invention, in association with a cutter of a drill bit, such as may be employed in well-drilling, including a stud member which rotatably supports the cutter.

Fig. 2 is an enlarged view of a portion of Fig. 1 illustrating the seal in detail.

Figs. 3 and 4 are fragmentary views of two of a number of possible types of shields which may be employed in this invention.

A well-drilling bit 8, such as is fragmentarily illustrated in Fig. 1, commonly is provided with three cutters 10 (only one being shown in the drawing) arranged equidistantly in a circle with the apices of the cutters pointing approximately to a common center at point C. As the three cutters differ only slightly, and as such differences are only in the arrangement of cutting teeth which have no direct bearing on this invention, the single cutter shown in Figs. 1 and 2 and the following description thereof should serve to give an adequate understanding of the invention.

The drilling bit 8 has a mounting shank 12 by which it is secured to the lower end of a rotary drilling tube (not shown) in a well understood manner, a spider or body portion 14 integral with the shank, and spider arms or studs 16 (only one being shown), integral with the spider and directed angularly inwardly toward the center point C. The bit also includes substantially similar conical cutters 10 suitably mounted by bearings 18, 20 and 22 for free rotation on each of the studs 16, and a seal 24 provided for the purpose of retaining lubricant in the bearings and to prevent dirt or other abrasive material from finding its way into the bearings.

The stud 16, shaped substantially as shown in the drawing, extends into a coaxial, substantially complementally shaped recess 26 in the cutter 10 and is externally, annularly grooved as at 28 and 30 to form, with opposed internal annular grooves 32 and 34 respectively in the cutter, a roller raceway for roller bearings 36 and a ball raceway for ball bearings 38. The bearing 22 comprises a center pin or stud 40, one end of which is tightly press-fitted into a coaxial bore 42 in the stud 16 and the other end of which extends with a close, bearing or relatively rotatable fit within a coaxial bore 44 in the cutter 10. The fit of the pin 40 in bore 44, preferably, is such as to leave a small lubricant-holding chamber 46. In service, of course, lubricant is not only in the chamber 46 but also in the bearings 18, 20 and 22 and between adjacent surfaces of the stud 16 and the cutter 10. It should be obvious that the position of the seal 24 is such as to keep lubricant in the assembly and to keep dirt out of the assembly.

It may be well here to remark that the balls 38, after the cutter has otherwise been assembled upon the stud 16, may be introduced into their raceway in a manner which has no bearing on the present invention and which, therefore, has not been illustrated in the drawing. One way in which the balls 38 may be introduced is to provide a drilled passage, leading from the exterior of spider stud 16 and opening into groove 30 and, hence, into the ball raceway, preferably at a point in groove 30 which carries little or no load. After the previously determined, proper number of balls have been introduced, the passage is closed by plugging and/or welding. In the illustrated structure the balls 38 serve not only as bearings, but also as means for locking the cutter 10 on the stud 16 while freely permitting rotation of the cutter.

The construction and functioning of seal 24 may best be understood from Fig. 2 from which it may be seen that the seal comprises a more or less dish-shaped sealing ring 48 preferably of a tough, durable material which, advantageously may be polytetrafluoroethylene which has become known by the trade-name "Teflon" or may be of other plastic material of about the same stiffness characteristic as Teflon, a preferably complementally dish-shaped shielding ring 50 intimately overlying the exterior of the sealing ring 48, and a clamping ring 52 for holding rings 48 and 50 in place on the stud 16.

It may be observed from Fig. 1, that the inside diameter of clamping ring 52, which is the smallest of the three mentioned rings, is at least slightly greater than any part of stud 16 which extends into the cutter 10; hence, all three of said rings may be moved endwisely over the end of said stud before the cutter is put into place. The stud 16 is annularly stepped, as at 54 and 56, to form shoulders 58 and 60 and cylindrical surfaces 62 and 64.

The ring 48, as illustrated, approximates, in radial section, the shape of a scimitar blade, being thinnest at its inner portion 66, thickest at an intermediate portion 68 and terminating at its outer margin in a relatively sharp sealing edge 70. The just-mentioned parts, in the illustrated form of ring 48, are bounded by or define an inner, peripheral, cylindrical surface 72, an outer, convex surface 74, an approximately cylindrical, outer, peripheral surface 76, a wide-angular conical inner surface 78, and a concave inner surface 80. The surface 72, preferably, should fit accurately about surface 62 of the stud 16. The sealing ring 48, as hereinafter explained, flexes somewhat in use.

The shielding ring 50 also flexes somewhat in use and is preferably formed, to the shape illustrated and already indicated, of suitable metal such as, for example, cold rolled stainless steel. It is preferably of uniform thickness to render it somewhat resilient to enable it to function as hereinafter explained. When the specified stainless steel is used, a thickness of approximately .005 inch should be satisfactory. As illustrated in Figs. 2 and 3, the ring 50 is continuous or non-interrupted about either periphery.

The clamping ring 52 is preferably of steel and of such dimensions that its inner, peripheral, cylindrical surface 82 will effect a tight press fit upon surface 64 of the spider arm or stud 16. The outer periphery of the clamping ring is preferably rounded and tapered, as at 84, providing suitable clearance between the clamping ring and the inner, concave surface 80 of the sealing ring 48.

The three described parts of the seal 24 may easily be pushed into place upon the stud 16 before the cutter 10 is brought into the assembly. The shielding ring 50 may either be separate or fixed to the outer, convex surface 74 of the sealing ring. If separate, it may be disposed into position with the inner, marginal portion of its outer surface lying against the shoulder 58 of the stud 16; then the sealing ring 48 may be pushed into place against the shielding ring (or, of course, the two said rings, if secured together, may be placed into position as a unit); and then the steel clamping ring 52 may be press fitted by the use of suitable apparatus into position upon cylindrical surface 64 of the stud 16 with a marginal portion of said ring backed tightly against shoulder 60 on said stud. This completes installation of the seal itself and, at this point in the assembly of the drill bit, the sealing ring 48 and shielding ring 50 are unflexed or in non-stressed condition, in which their shapes and positions are as indicated in dot-and-dash lines in Fig. 2.

After the seal 24 has been put into place in the manner described, the rollers 36 are placed in groove 28 and then the cutter 10 is pushed into place on stud 16. As the cutter moves into place, an outer end flat surface 86 thereof first contacts the sealing edge 70 of the sealing ring. The grooves 30 and 34, formed respectively in the stud 16 and the cutter 10, are not then quite in radial alignment, but the cutter must be pushed further into the stud 16 in order to bring said grooves into radial alignment to receive the balls 38. This additional pushing is possible only because the sealing ring 48 and its related shielding ring 50 will yield to some extent to their positions, as indicated in full lines in Fig. 2, thus setting up a spring reaction which serves to maintain the sealing ring's sealing edge 70 in firm sliding, sealing engagement with flat end surface 86 of the cutter. The shielding ring 50 has hereinbefore been described as being uninterrupted or continuous at its margins but, despite that condition, the shielding ring may be of such thickness and composition as to yield, somewhat in the manner of a "Belleville" spring, to maintain a very strong and firm contact of the sealing edge 70 with the flat surface 86.

The pushing of the cutter into its final position, as just described, brings the grooves 30 and 34 into radial alignment, whereupon a proper number of ball bearings 38 are introduced into said grooves in the manner hereinbefore described. The ball bearings thus coact with the mentioned grooves not only for bearing purposes but also for the purpose of holding the cutter against becoming disassociated from the stud 16.

It is preferable to maintain a circular line contact or a narrow, annular area of sliding, sealing contact of the edge 70 of the ring 48 with the surface 86; hence, the provision of the conical surface 78. It might appear that such a line or narrow contact could best be maintained if the ring 48 were of uniform thickness but, in that condition, the ring 48, even though backed up by the shielding ring 50, could not maintain as forceful a sliding contact as is desired with the surface 86. By forming the ring 48 with the thickened intermediate portion 68, said ring is considerably stiffened so that it, aided by the shielding ring, serves to maintain the desired forceful, sliding, sealing contact between the ring 48 and the surface 86.

Fig. 4 shows, fragmentarily, a portion of an alternate form of shielding ring 50a which, instead of its peripheries being uninterrupted or continuous as with ring 50, is formed with a plurality of equidistant radial slits 88 in a series extending completely around the ring. These slits preferably should be nothing more than cuts which will form a circumferential series of similar spring fingers 90 in an outer, marginal portion of the shielding ring. Obviously, the provision of such spring fingers will enable the sealing ring 48 to engage the flat surface 86 somewhat more lightly than in the shielding ring structure of Fig. 5 but, nevertheless, with sufficient force to provide an adequate seal with respect to the flat surface 86. As is well known to those familiar with the manner of usage of drill bits of the character disclosed in this application, drilling mud circulates about the exterior of the bit and of the seal 24 and, of course, washes against said seal, sometimes with considerable force and, as the mud contains abrasive matter, it is obvious that, if a non-shielded seal were used, a flexible sealing element comparable to, or equivalent to, the sealing ring 48 would be worn away very quickly by the mud, under which condition the mud would find its way into the bearings, and the lubricant would escape from the bearings so that the bearings would break down before, and undoubtedly long before, the cutting surfaces of the cutter 10 became worn beyond their useful life. By utilizing a seal having a shielding ring as disclosed in the present application, the shielding ring of highly abrasive-resistant metal protects the underlying sealing ring so that the latter may function satisfactorily both for the exclusion of the mud and for the retention of lubricant throughout the entire useful life of the cutting surfaces of the cutter. It follows, therefore, that, by constructing a drill bit with such a shielded seal as a part thereof, the result is an improved bit having a much longer life and one which, of course, need not be replaced as frequently as those heretofore developed, leading to operational savings by reason of the fact that the equipment is kept in uninterrupted operation for longer periods of time than heretofore. It should be clear also that, even though cuts are provided, as shown at 88 in Fig. 4, those cuts would not be wide enough to permit mud to get to any substantial area of the outer surface of the sealing ring. Thus, there would be little or no wear at said surface, and any wear that might conceivably occur there would be infinitesimal and would not detract from the described effectiveness of the seal as a whole.

It should be obvious that, while an improved shielded seal has been described and illustrated herein as applied to a drill bit, such seals, nevertheless, may be very useful in other structures where non-shielded seals would be subjected to excessive wear; therefore, the present invention is not limited to drill bits but extends to all structures to be sealed with which a shielded seal as disclosed herein could be advantageously employed.

The structures disclosed herein obviously could be modified in various ways without, however, departing from the invention as set forth in the following claims.

What I claim is:

1. A shielded seal for a rotary, well-drilling bit, said bit being provided with a stud, a roller cutter rotatably mounted on said stud and having an annular end surface extending transversely of the cutter's axis of rotation about said stud, a chamber formed between said cutter and said stud, cutter bearings in said chamber rotatably supporting said cutter on said stud, said seal comprising a yieldable, centrally apertured, dish-shaped sealing ring, of Teflon or other plastic material of approximately the same stiffness characteristic as Teflon, having a marginal portion at its inner periphery in engagement with and in fixed sealing association with said stud, and a sealing surface at its outer periphery adapted to effect a sliding seal with said annular end surface of the cutter to retain lubricant within said chamber, said sealing ring having a concave inner surface facing said chamber and a convex outer surface constituting substantially the entire outer side surface area of said ring about which abrasive-containing material flows in operation, said seal also comprising a yieldable, centrally apertured, dish-shaped shielding ring, of stiff, resilient, sheet metal which is more abrasive-resistant than the material of the sealing ring, and having a concave inner surface, intimately contacting substantially the entire said convex outer surface of the sealing ring and continuously in such intimate contact during operation, to shield the sealing ring against abrasion from such abrasive-containing material, and a shoulder on said stud in backing position in relation to said shielding ring, the latter also constituting a spring under compression between said shoulder and said sealing ring to aid the latter in maintaining a firm, sliding, sealing engagement of its said outer, peripheral sealing surface with said annular end surface of the cutter.

2. A shielded seal according to claim 1, the said shielding ring having a circumferential series of slits, opening at its outer periphery, defining spring fingers for yieldably urging the outer periphery of the sealing ring into such sliding sealing association with said transversely extending, annular, end surface of the cutter.

3. A shielded seal according to claim 1, said sealing ring having an annular portion, intermediate its two said peripheries, which is substantially thickened to increase the stiffness of the sealing ring at said intermediate annular portion; said thickened portion diminishing gradually in thickness toward the two said peripheries of the sealing ring.

4. A shielded seal for effecting a seal between two coaxial, relatively rotatable elements, comprising an assembly of a dish-shaped shielding ring and a dish-shaped sealing ring nested within said shielding ring, the inner face of the shielding ring being in intimate, protective contact with substantially the entire adjacent outer face of the sealing ring; said assembly having an inner, circular, peripheral portion adapted to be mounted fixedly and fluid-tightly upon the radially innermost of said relatively rotatable elements, the sealing ring having an outer peripheral portion with a circular sealing surface, on its side opposite from said shielding ring, adapted to effect a sliding rotary seal with an annular surface of the radially outermost of said relatively rotatable elements, the said sealing ring being of flexible material and the said shielding ring being of stiff, resilient, sheet metal which is more resistant to abrasion than the material of the sealing ring, the said assembly being adapted to be under axial compression in use, and the shielding ring, when the assembly is under such axial compression, constituting a spring coacting with the sealing ring to aid the latter in maintaining the sealing ring's said circular sealing surface in sliding sealing association with the mentioned annular surface of said radially outermost of the relatively rotatable elements.

References Cited in the file of this patent

UNITED STATES PATENTS

| | | |
|---|---|---|
| 1,884,965 | Baggett et al. | Oct. 25, 1932 |
| 2,009,281 | Stein | July 23, 1935 |
| 2,221,554 | Okun | Nov. 12, 1940 |
| 2,227,408 | Hately | Dec. 31, 1940 |
| 2,559,149 | Allen | June 3, 1952 |
| 2,600,433 | Saywell | June 17, 1952 |

FOREIGN PATENTS

| | | |
|---|---|---|
| 456,570 | Great Britain | Nov. 11, 1936 |
| 978,288 | France | Nov. 22, 1950 |